US007010492B1

(12) United States Patent
Bassett et al.

(10) Patent No.: US 7,010,492 B1
(45) Date of Patent: Mar. 7, 2006

(54) METHOD AND APPARATUS FOR DYNAMIC DISTRIBUTION OF CONTROLLED AND ADDITIONAL SELECTIVE OVERLAYS IN A STREAMING MEDIA

(75) Inventors: Ronald W. Bassett, Pflugerville, TX (US); Bruce A. Beadle, Round Rock, TX (US); Michael Wayne Brown, Georgetown, TX (US); Leon P. Doud, Austin, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,593

(22) Filed: Sep. 30, 1999

(51) Int. Cl.
*G06F 17/60* (2006.01)

(52) U.S. Cl. .......................................... 705/1; 725/142
(58) Field of Classification Search ................ 705/1, 705/14; 725/142, 37, 86, 135, 139; 345/762
See application file for complete search history.

(56) References Cited

U.S. PATENT DOCUMENTS

| | | |
|---|---|---|
| 4,316,285 A | 2/1982 | Bobilin et al. |
| 4,487,698 A | 12/1984 | Freeman |
| 4,847,599 A | 7/1989 | Imiolex et al. |
| 4,847,700 A | 7/1989 | Freeman |
| 5,144,663 A | 9/1992 | Kudelski et al. |
| 5,168,356 A | 12/1992 | Acampora et al. |
| 5,195,092 A | 3/1993 | Wilson et al. |
| 5,258,843 A | 11/1993 | Truong |

(Continued)

FOREIGN PATENT DOCUMENTS

| | | |
|---|---|---|
| CA | 2250450 | 4/1999 |
| EP | 692911 A2 | 1/1996 |
| EP | 0776107 A2 | 5/1997 |
| EP | 805600 A2 | 11/1997 |
| JP | 10-257050 | 9/1998 |
| WO | WO 97/12486 | 4/1987 |
| WO | WO 96/17467 | 5/1998 |
| WO | WO 98/41020 | 9/1998 |
| WO | WO 99/04561 | 1/1999 |
| WO | 2327837 | 2/1999 |
| WO | WO 99/30493 | 2/2000 |

OTHER PUBLICATIONS

International Business Machines Corporation; Technical Disclosure Bulletin; Vol 40, No. 10; Oct. 1997; Structured Metadata for Application Specific Viewers for Streamed Internet Video/Audio; pp 123–127.

International Business Machines Corporation; Technical Disclosure Bulletin; Vol 39, No. 02, Feb. 1996; Analog Interactive Television System with Two Service Levels; pp. 157–161.

International Business Machines Corporation; Technical Disclosure Bulletin; vol. 36, No. 09B, Sep. 1993; Resource Management System for Multimedia Devices; pp. 525–529.

(Continued)

*Primary Examiner*—Thomas A. Dixon
(74) *Attorney, Agent, or Firm*—Duke W. Yee; Jeffrey S. LaBaw; Francis Lammes

(57) ABSTRACT

A method and apparatus for providing a tailored content stream to respective clients from a server. A client profile is generated for each of the respective clients. From a plurality of related streams, streams are selected to send to each respective client based on the respective client profile. Each respective client is sent only the respective selected streams for the client.

34 Claims, 6 Drawing Sheets

U.S. PATENT DOCUMENTS

| | | | |
|---|---|---|---|
| 5,408,465 A | | 4/1995 | Gusella et al. |
| 5,422,674 A | | 6/1995 | Hooper et al. |
| 5,491,517 A | | 2/1996 | Kreitman et al. |
| 5,508,732 A | | 4/1996 | Bottomley et al. |
| 5,543,856 A | | 8/1996 | Rosser et al. |
| 5,548,704 A | | 8/1996 | Steiner et al. |
| 5,548,726 A | | 8/1996 | Pettus |
| 5,568,167 A | | 10/1996 | Galbi et al. |
| 5,594,507 A | | 1/1997 | Hoarty |
| 5,611,038 A | | 3/1997 | Shaw et al. |
| 5,630,067 A | | 5/1997 | Kindell et al. |
| 5,652,615 A | | 7/1997 | Bryant et al. |
| 5,671,377 A | | 9/1997 | Bleidt et al. |
| 5,724,091 A | | 3/1998 | Freeman et al. |
| 5,778,184 A | | 7/1998 | Brownmiller et al. |
| 5,781,227 A | | 7/1998 | Goode et al. |
| 5,790,815 A | | 8/1998 | Swanstrom et al. |
| 5,794,018 A | | 8/1998 | Vrvilo et al. |
| 5,826,165 A | | 10/1998 | Echeita et al. |
| 5,838,678 A | | 11/1998 | Davis et al. |
| 5,856,973 A | | 1/1999 | Thompson |
| 5,859,660 A | | 1/1999 | Perkins et al. |
| 5,861,881 A | | 1/1999 | Freeman et al. |
| 5,864,682 A | | 1/1999 | Porter et al. |
| 5,867,799 A | | 2/1999 | Lang et al. |
| 5,872,588 A | | 2/1999 | Aras et al. |
| 5,892,754 A | | 4/1999 | Kompella et al. |
| 5,893,091 A | | 4/1999 | Hunt et al. |
| 5,901,287 A | | 5/1999 | Bull et al. |
| 5,917,559 A | | 6/1999 | Um |
| 6,014,694 A | | 1/2000 | Aharoni et al. |
| 6,057,833 A | | 5/2000 | Heidmann et al. |
| 6,154,745 A | * | 11/2000 | Kari et al. .................. 707/100 |
| 6,236,805 B1 | | 5/2001 | Sebestyen |
| 6,493,832 B1 | | 12/2002 | Itakura et al. |
| 6,578,201 B1 | | 6/2003 | LaRocca et al. |

OTHER PUBLICATIONS

International Business Machines Corporation; Technical Disclosure Bulletin; vol. 39, No. 08, Aug. 1996; User Guided Selection or Elimination of Identified Information in Video Sequence; pp. 141–146.

Krunz, M. et al.; Scheduling and Bandwidth Allocation for the Distribution of Archived Video in VOD Systems; Telecommunication Systems—Modeling, Analysis, Design and Management; Vol 9, No. 3–4, pp. 335–355, 1998.

Ng JKY et al.; A Distributed MPEG Video Player System With Feedback and QoS Control; Proceeding Fifth International Conference on Real–Time Computing Systems and Applications pp 91–100; 1998.

Zhu Xiaomin et al.; Fuzzy Scheduling of Coupled Customers to a Queueing Network with Parallel Servers; Journal of Systems Science and Systems Engineering vol 7, no 4, pp. 482–487; Dec. 1998.

Mielke M. et al.; A Multi–Level Buffering and Feedback Scheme for Distributed Multimedia Presentation Systems; Proceedings $7^{th}$ International Conference on Computer Communications and Networks; pp. 219–226; 1998.

Curtis, P. et al.; Secure Multimedia Coordination System for Plural Network Users Supports Plural Levels of Communication by Dynamically Controlling Channels of Data, With Central Server Connected to Client Work Stations; Jan. 16, 1996.

Zon Yin Shae et al.; Capture and Playback Synchronization in Video Conferencing; Proceedings of the SPIE—The International Society for Optical Engineering, vol 2417, pp. 91–101,, 1995.

Sugh Hoon Lee et al.; Retransmission Scheme for MPEG Streams in Mission Critical Multimedia Applications; Proceedings $24^{th}$ Euromicro Conference vo. 2, pp 574–580; 1998.

Galbi, D. et al.; An MPEG–1 Audio/Video Decoder with Run Length Compressed Antialiased Video Overlays; 1995 IEEE International Solid–State Circuits Conference. Digest of Technical Papers, pp. 286–287, 381; 1995.

Coden, MH.; Switch Ethernet Revamps Ad Insertion; CED, Vol 24, No 4, pp. 62,64,66,68, Apr. 1998.

McGrath, E.; Digital Insertion of Advertising into a Digital Stream (DID); International Broadcasting Convention, Sep. 1997, pp. 258–261.

Smirnov, MI; Efficient Multicast Routing in High Speed Networks; Computer Communications vol 19, no 1 pp. 59–75, Jan. 1996.

Malinovski, T. et al.; Design of Multimedia Presentation Using Synchronized Video, Animation and Sound Streams; Proceedings of the $17^{th}$ International Conference on Information Technology Interfaces, pp. 495–500, 1995.

Gallagher et al., "A Framework for Targeting Banner Advertising on the Internet", System Sciences, 1997, Proceedings of the Thirtieth Hawaii International Conference, 1997 IEEE, pp. 265–274.

* cited by examiner

METHOD AND APPARATUS FOR DYNAMIC DISTRIBUTION OF CONTROLLED AND ADDITIONAL SELECTIVE OVERLAYS IN A STREAMING MEDIA

CROSS REFERENCE TO RELATED APPLICATIONS

The present invention is related to applications entitled METHOD AND APPARATUS FOR USER-CONTROLLED SELECTIVE OVERLAY IN A STREAMING MEDIA, Ser. No. 09/409,594; and METHOD AND APPARATUS FOR DYNAMIC TARGETING OF STREAMING MEDIA USING STATISTICAL DATA, Ser. No. 09/409,601; all of which are filed even date hereof, assigned to the same assignee, and incorporated herein by reference.

BACKGROUND OF THE INVENTION

1. Technical Field

The present invention relates to the field of computer software and, more particularly, to methods of controlling and providing additional selective overlays in a streaming media.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty.

However, currently, the Internet has not reached the level of popular use encountered by more traditional media sources such as television. Information from these more traditional media is typically broadcast in mass, often too many people who have no interest in the information. Because, for any individual, so much of the information is of little or no interest, much wanted information is lost in the information overflow from unwanted sources. Even the Internet, although providing more specialized information than other media, does not provide and tailor information for individual consumer's taste.

Furthermore, traditional media, and even the Internet in some respects, lack methods to specifically target advertisements to specific individual viewers. Additionally, methods of determining the viewing tastes of and gathering feedback regarding programming preferences from individual viewers is crude at best. The best methods currently available merely target programming and advertising to particular demographics based on rough statistics of what kind of individual is likely to be enjoy a particular program type. Furthermore, presently, methods for controlling the media delivered to viewers does not allow for fine tuning to cater to each individual.

Therefore, there is a need to provide methods for more selectively controlling the media streams delivered to individuals such that greater viewer satisfaction is achieved. Additionally, there is a need to provide methods for providing advertisements to viewers that have been more selectively tailored so as to more effectively capture the viewers attention. Furthermore, there is a need for methods of determining, in real time, viewer preferences such that programming may be dynamically tailored to be more pleasing to the viewer.

Therefore, it would be advantageous to have a method and apparatus for allowing customization of programming by a content provider.

SUMMARY OF THE INVENTION

The present invention provides a method and apparatus for providing a tailored content stream to respective clients from a server. A client profile is generated for each of the respective clients. From a plurality of related streams, streams are selected to send to each respective client based on the respective client profile. Each respective client is sent only the respective selected streams for the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
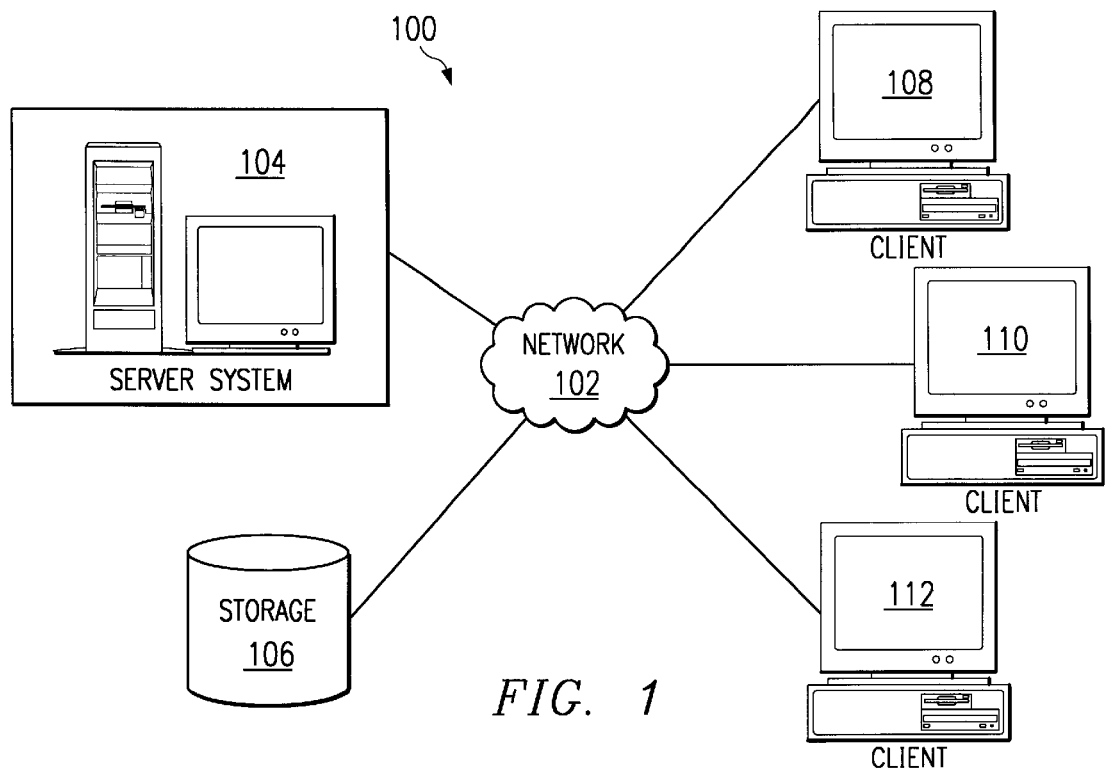
FIG. 1 is a diagram of a distributed data processing system in which the present invention may be implemented in accordance with a preferred embodiment of the present invention.

With reference now to the figures and in particular with reference to FIG. 1, a diagram of a distributed data processing system in which the present invention may be implemented is depicted in accordance with a preferred embodiment of the present invention. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server system 104 is connected to network 102, along with storage unit 106. Server system 104 may contain one or more server computers for providing data streaming. For example, a server may be used to administer and control data streams while another server within server system 104 is employed to originate resource data streams to clients. The information in these data streams may be stored within server system 104 or on a remote storage device, such as storage device 106. In addition, clients 108, 110 and 112 are also connected to network 102. These clients, 108, 110 and 112, may be, for example, without limitation, personal computers, set top boxes, web TV units, or any other hardware unit for receiving data streams. Clients 108, 110 and 112 are clients to server system 104. In the depicted example, server system 104 provides data streams to clients 108–112. Distributed data processing system 100 may include additional servers, clients, and other devices not shown.

Clients 108, 110, and 112 include mechanisms for mixing and filtering data streams received from server system 104 or other server systems not shown. These mechanisms may be implemented in hardware, software, firmware, or some combination thereof in the depicted examples.

Distributed data processing system 100 may be, for example, the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages.

Another implementation for network 102 is as a broadband network, also referred to as a broadband integrated services digital network (BISDN). In such a network, broadband services typically provide channels capable of supporting data transmission rates of greater than 1.5 Mbps or a primary rate in integrated services digital network (ISDN), T1, or DS1. In broadband system, the type of transfer mode typically is a synchronous transfer mode (ATM) with the use of synchronous optical network (SONET) and intelligent network (IN) technologies as providing the framework for ISDN. In such a network, information including voice, data, video, and audio are transferred through the network to various clients.

Further, network 102 also may be a cable communications system depending on the implementation. Of course, distributed data processing system 100 also may be implemented as a number of different types of networks such as, for example, an intranet or a local area network. FIG. 1 is intended as an example and not as an architectural limitation for the processes of the present invention.

Figure 2:
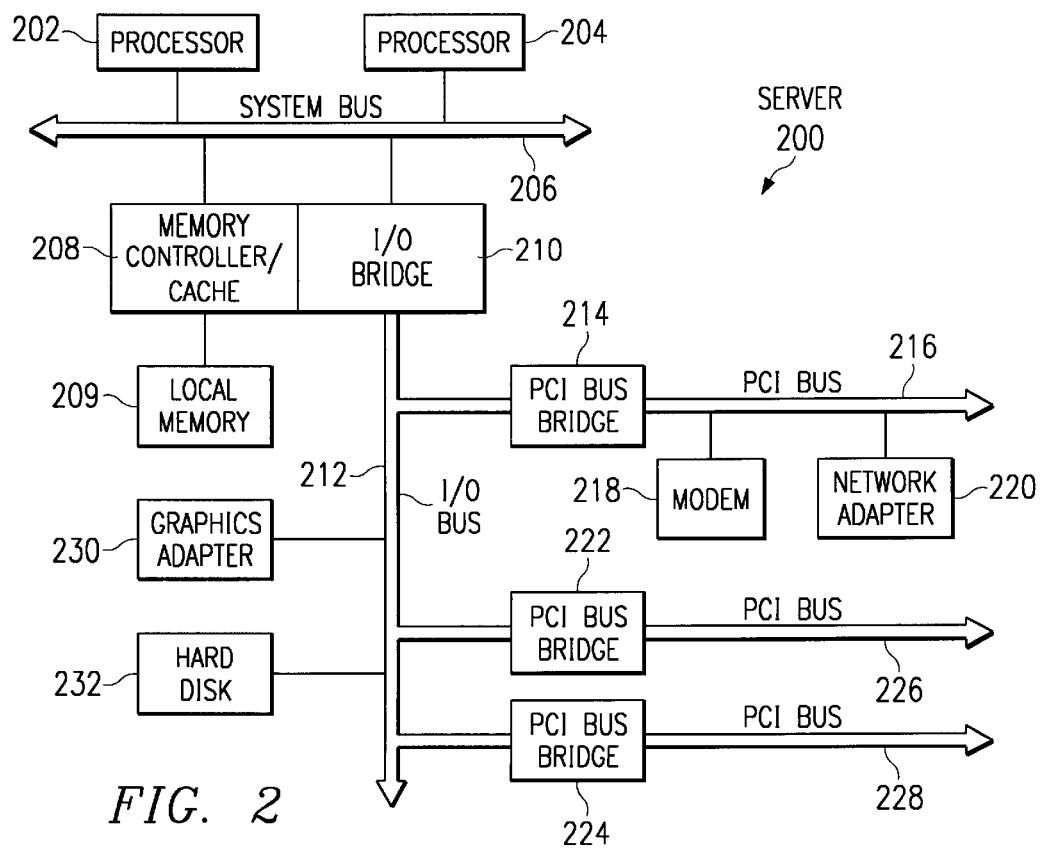
FIG. 2 is a block diagram of a data processing system, which may be implemented as a server system is depicted in accordance with the present invention.

Referring to FIG. 2, a block diagram of a data processing system, which may be implemented as a server system, such as server system 104 in FIG. 1, is depicted in accordance with the present invention. Data processing system 200 may be employed as a video server or other application server within a server system.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
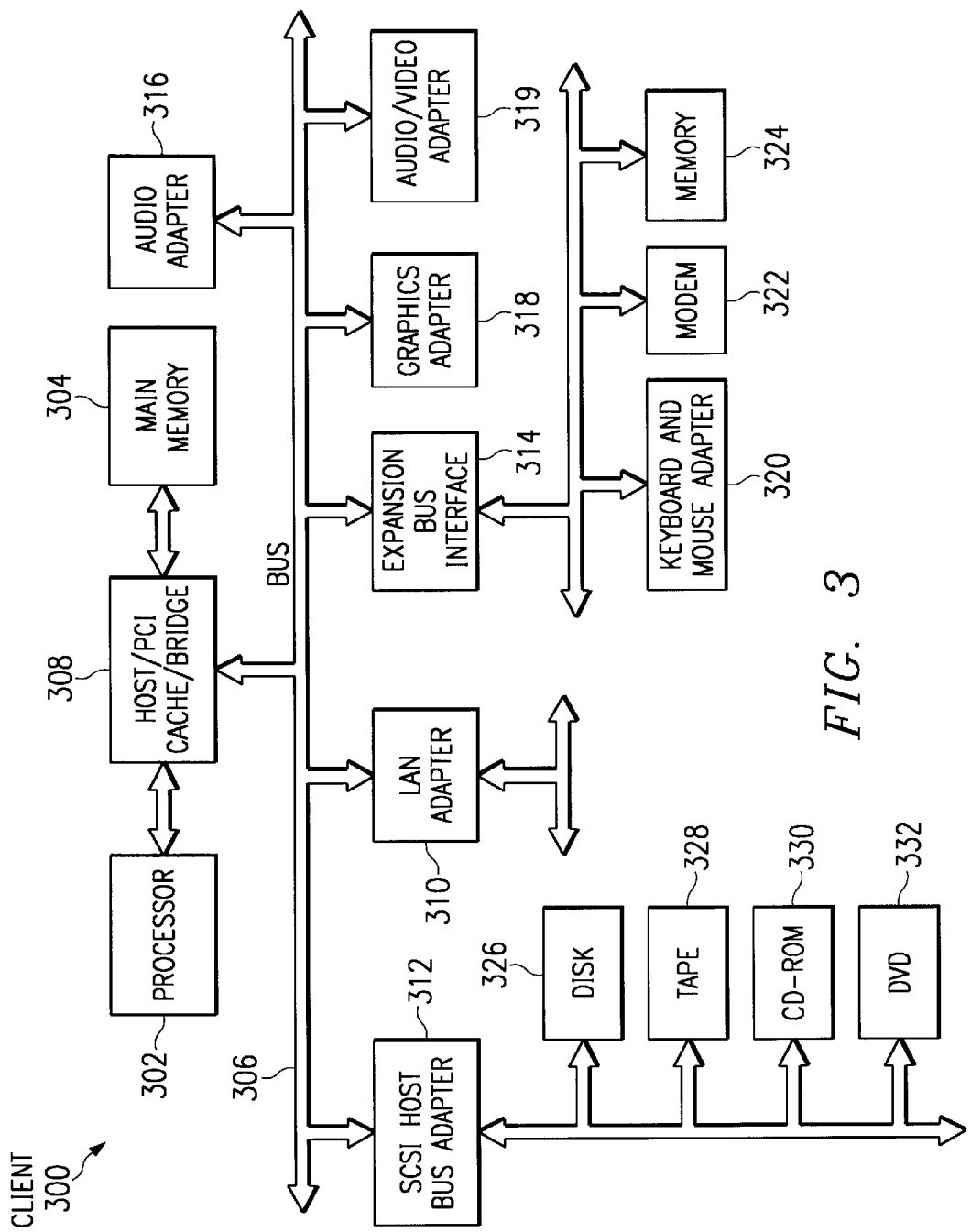
FIG. 3 is a block diagram of a data processing system in which the present invention may be implemented.

With reference now to FIG. 3, a block diagram of a data processing system in which the present invention may be implemented is illustrated. Data processing system 300 is an example of a computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems. Additionally, data processing system 300 may take the form of a notebook computer or a personal digital assistant (PDA). Further, the data processing system may be, for example, without limitations, a television or settop cable box containing appropriate hardware and software for implementing processes of the present invention.

The present invention provides a method, apparatus, and computer implemented instructions for decreasing bandwidth usage and for providing increased client customization of programs or events. The mechanism of the present invention is directed towards tailoring a multimedia presentation on a multimedia data processing system. This is accomplished by breaking up a program or event into different data streams for different audio and video components. Additional optional data streams may be added to allow for customization of the program or event. A data processing system may receive a set of video and audio streams associated with a program or event. These data streams may be selectively presented based on user input. Depending on the user input, some portions of the video and audio data streams may be presented while other data streams are unpresented. Further, user input may selectively place a video stream on a display in different locations. Also, information streams containing text and/or graphics may be received and selectively displayed in association with the presentation of the program or event. The combination of these data streams at the user site provides for customization without requiring broadcasting of multiple versions of an event to viewers.

By allowing a viewer to customize a program or event, bandwidth usage may be reduced because program originators do not have to broadcast multiple versions of a program or event for different geographical regions or different viewer basis.

More specifically, the present invention provides a mechanism to allow a content provider to provide programs or events to users in the form of multiple data streams. The mechanism of the present invention allows a content provider to control data streams sent to a user based on input and other data received from a user. The user information may take the form of a filter profile, which contains information about selections made by a user. The filter profile also may contain other information such as location and demographic information that may or may not be used in tailoring and customizing a program for a user. The present invention also provides a mechanism for presenting data streams on a user system that the content provider feels is important for the user to see or hear even though the user may not have selected these data streams. For example, an embedded command may be included in the data streams sent to the user to cause a multimedia system to present a data stream that the content provider wants presented even though the user may not have selected that particular data stream.

Figure 4:
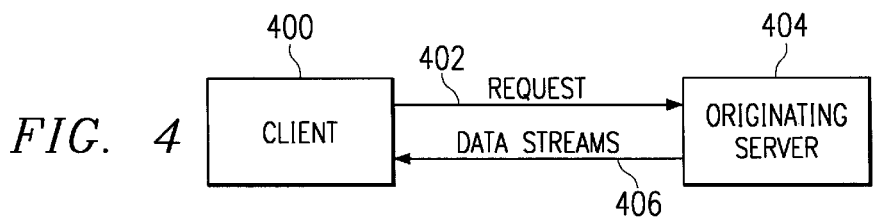
FIG. 4 is a block diagram broadly illustrating the process of the present invention.

Turning now to FIG. 4, there is shown a block diagram broadly illustrating the process of the present invention. A client 400, such as data processing system 300 in FIG. 3, sends a request 402 for programming content to an originating server 404. Originating server 404 is a data processing system, such as data processing system 200 in FIG. 2, and is the host for the programming content requested by client 400. Originating server 404 sends the requested programming as a set of data streams 406 back to client 400. Data streams 406, may be used to present programming or events to a user at client 402. Furthermore, data streams 406 may comprise one or more video stream components, one or more information stream components, and one or more audio stream components.

Client 400 and originating server 404 have been described and illustrated in FIG. 4 as though they are directly connected. However, client 402 and originating server 404 are preferably part of a distributed data processing system such as distributed data processing system 100 in FIG. 1 and are linked together via a network, such as network 102.

The environment illustrated in FIG. 4 may be a one way environment or a two way environment. In a one way environment, the server sends data to the client, but does not receive data from the client. In this case, a client receives a full range of data streams from the server. A filter is used to allow data streams selected by the user to be presented while non selected data streams remain unexposed to the user. A profile about the user may be created based on the user input. This profile contains customization information based on user input as well as information about the user at the client. This information may include, for example, an identification of preferences, data stream selections, as well as circumstantial information, such as location.

In a two way environment, the server sends data to the client and the client sends data back to the server. In such an environment the server for the content provider sends only selected data streams to the client based on a profile received from the client.

Figure 5:
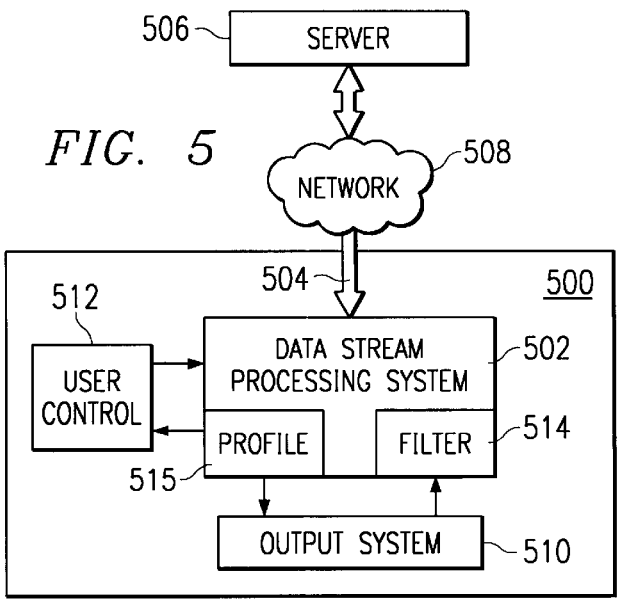
FIG. 5 is a block diagram of functional components used in the selection of media streams depicted in accordance with the present invention.

Turning next to FIG. 5, a block diagram of functional components used in the selection of media streams in accordance with the present invention is depicted. In this example, client 500 includes a data stream processing system 502 to receive data streams 504 from a server 506 through network 508 for output to output system 510. Server 506 in this example is a source for content from a content provider. The selection of data streams received from network 504 are controlled through user control 512, which controls data stream processing system 502. User control 512 is used to manipulate or adjust filter 514, which filters data streams 504 in data stream processing system 502 to selectively present data streams 504 on output system 510. Also present in data streaming processing system 502 is a profile 515, which may be generated based on user preference setting, data stream selections, and filters applied. For example, profile 515 may include information identifying current volume settings at client 500. A low volume setting below some threshold may indicate that the users are not really watching or paying attention to the event. Profile 515 also may include other information, such as, for example, the geographic location of client 500. Multiple data streams may be received from network 508 through connection 504. These data streams may be, for example, audio, video, text, graphics, or other information that may be displayed through output system 510 to a user of client 500. Selection filtering of data streams from network 508 by data stream processing system 502 are controlled through user control 512. The selected data stream or selected portions of data streams are displayed to user through output system 510, which may be used to drive displays and audio output devices, such as a high definition television or speakers. Further, video streams may be configured for parameters, such as, for example, opacity and scaling.

Figure 6:
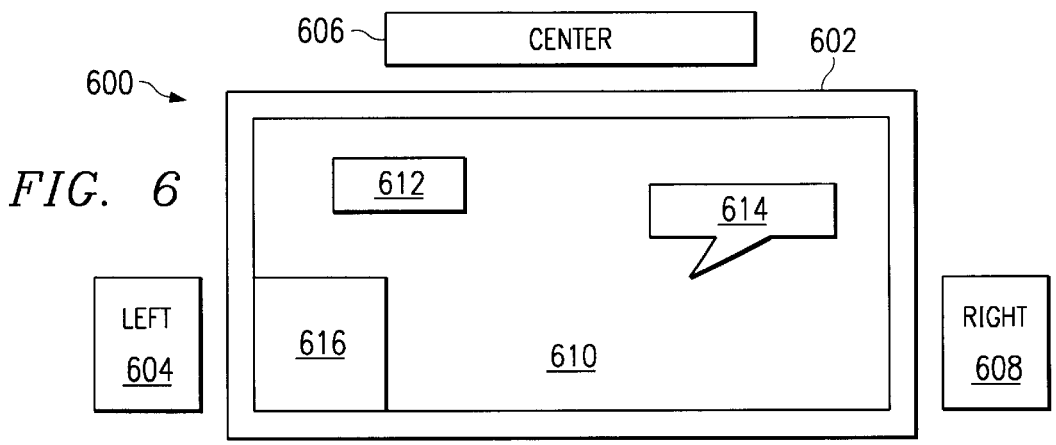
FIG. 6 is a diagram illustrating an example display depicted in accordance with a preferred embodiment of the present invention.

With reference now to FIG. 6, a diagram illustrating an example display is depicted in accordance with a preferred embodiment of the present invention. In this example, a presentation system 600 is presented with a display unit 602, audio sources 604, 606, and 608. Presentation system 600 is the part of a client through which the user sees and hears programs. In this example, audio source 604 is a left speaker while audio source 608 is a right speaker. Audio source 606 is the center speaker in this example. The video 610 is displayed in display 602 with text box 612, text box 614, and video 616. Video 610 is the primary data stream in this example with text box 612 and text box 614 being overlaid over video 610.

Text box 612 and text box 614 are generated from two data streams in this example. Text box 612 is a stationary text box, which may be used to provide information, such as statistics about the program, upcoming programs, or any other information the user may select. Text box 614 in this example is a "pop-up," which may be used to provide information about a particular object or person in video 610.

Additionally, the data packets in text box 614 may include data to reposition text box 614 to follow a particular object or person. Video 616 is displayed using another data stream to provide additional viewing for the user. For example, video 616 may provide different perspectives in the program or may illustrate scenes not currently displayed within video 610. Initially, the user may select various audio streams for feed through 604, 606, and 608. For example, if the programming being displayed is a sporting event, the user might select a particular player and have audio information about that player played over 608 or have direct feeds from a microphone located on the player played through 604.

By way of example, consider a football game being broadcast across the Internet or a broadband network. The end user is able to select from and mix several audio streams. For example, the quarterback microphone of either team, the coach's microphone of either team, and/or the announcers, of which, there could be several (e.g., John Madden, Phil Simms, Howie Long, Bruce Beadle, Michael Paolini, etc.). In this manner, the user is able to tune-out (deselect) John Madden if they find him offensive. The user might instead choose to listen to the Quarterback microphone of the 49er's (or the opposing team, or another announcer of their choice, or to listen in another language entirely) without having to change the channel/coverage.

Carrying the football example further, with the present invention, it is possible to have a separate audio track for viewers that are new to the sport. This separate audio track would explain the rules of the game and what is happening in additional detail. It would also explain the technical jargon particular to football. The user may choose to have this additional information presented as a text stream.

In yet another example of the use of the present invention, continuing with the football theme, the user could place team A's player voices on the right channels with team B's player voices on the left channels and the announcers' voices on the rear channels. Furthermore, the user could select the player with the ball such that this player's voice is always on the center channel.

One primary data stream representing the video (which does not change no matter which audio overlay streams are selected), and many small add-on data streams representing audio or video overlays may be used to present the program. These streams could be mixed together or assigned to channels (right, left, rear, center, etc.) and/or 3-D positional locations using the latest "Dolby Digital" from Dolby Laboratories and other similar technologies. In addition, the volume could be adjusted on a per-overlay basis. More information on technologies, such as "Dolby Digital" may be found in U.S. Pat. No. 5,912,976.

With respect to video overlays, several video overlays can also be streamed and selected in a manner similar to the audio streaming and mixed to "overlay" the final video. If, for example, the desired overlay was a balloon shaped pop-up at a certain video display position containing some text, then the additional overlay stream would not have to be video itself, but rather the information to create the overlay video. Therefore, the size of the data stream would be much, much smaller than a primary video stream. Additionally, unrelated information in addition to the data streams slected for an event, such as, for example, stock market data or news headlines also may be provided to the user. If, for example, the event or programming being viewed is that of a football game, it is possible to have a video overlay stream dedicated to displaying pop-up balloons with data, such as statistics on players in which these pop-up balloons may appear over the players themselves. Additionally, betting odds, other interesting facts about the players, or rules and information about events may be displayed in this manner. Another type of data stream may include embedded pictures of players with biographies tagged on as well.

For other types of programming, other pop-up windows may be provided. For example, for a murder mystery show, pop-up windows giving clues about future events may be displayed or facts about actors, the script, or director also may be displayed in association with the program.

In this manner, in the context of the football game example, it is possible to have video overlay streams dedicated to displaying pop-up balloon(s) with data such as: statistics on players (they very well might appear over the players themselves), betting odds, odd or interesting facts, information explaining what is happening and rules (for novices), a summary of different on-going sporting event data (such as scores and statistics from other games in progress), stock market data, and news headlines to provide but a few examples. Another stream type might contain embedded pictures of the players with bios tagged on as well.

In another embodiment, it is possible to make the overlays selectable. That is to say that the user might do the equivalent of "clicking" on one, to trigger additional overlay streams, or lock it in place. For example, selecting a player's "name overlay" might for example bring up an overlay with that player's biography. In a one-way system, this could be done by having an overlay channel which continually cycles through all the players biographies, and having the client "select" the one of interest at the time of broadcast.

Additionally, the user could select between the different options using their client and thus have a lot more control of the information they would like to see and hear during a broadcast.

Figure 7A:
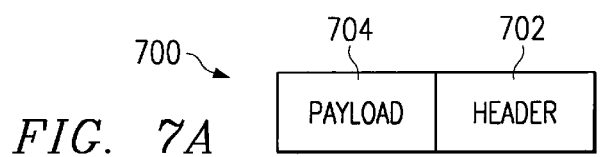
FIGS. 7A–7D are diagrams illustrating data structures contained within data streams sent to a client depicted in accordance with a preferred embodiment of the present invention.

Turning now to FIGS. 7A–7D, diagrams illustrating data structures contained within data streams sent to a client are depicted in accordance with a preferred embodiment of the present invention. In FIG. 7A, a data packet 700 is shown in which the data packet includes a header 702 and a payload 704. Header 702 contains information used in routing and handling data contained within payload 704 of data packet 700.

Figure 7B:
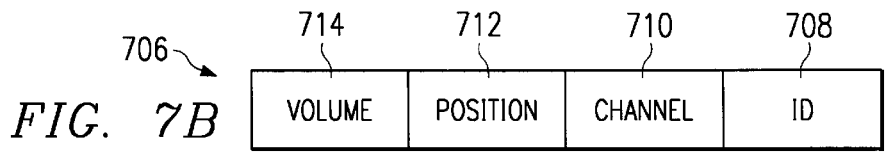

In FIG. 7B, an example of header information found within a data packet, such as data packet 700, is shown. In this example, header 706 includes an ID field 708, a channel field 710, a position field 712, and a volume field 714.

In this example, header 706 is a header identifying an audio packet. ID field 708 is used to identify the type of data packet. Channel field 710 in this example may be used to identify the channel or channels in which the data packet is to be presented to the user. For example, channel field 710 may be used to identify channels such as those in a surround system. The channels may be, in this example, right, left, rear, or center. Additionally, position field 712 also is included such that three dimensional positional locations using sound technologies such as Dolby Digital may be employed. This positional information may provide a default positioning that may be altered by a user. Volume field 714 is included to allow for adjusting the volume of the data in this data packet relative to other data packets to allow for overlays or emphasis for different data streams. Other fields may be used in addition to or in place of fields shown in header 706 for presenting audio information.

Figure 7C:
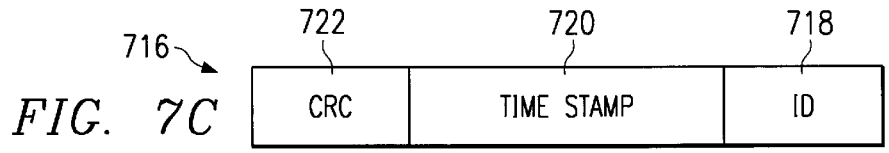

In FIG. 7C, a header 716 is an example of header information found in a video packet used in a video stream. In this example, header 716 includes an ID field 718, a time stamp field 720, and a CRC field 722. ID field 718 is used to identify the type of data contained within the packet, while time stamp 720 in this example is used for synchronization purposes. CRC field 722 may be used for error checking or synchronization purposes depending upon the implementation. If CRC field 722 is used for synchronization purposes, the CRC data is calculated for another data stream and placed within this field prior to being transmitted or broadcast to a viewer. The CRC data may be, for example, calculated for a frame or a portion of a frame in the other data stream. When this data stream and the other data stream are received, CRC data is calculated for a frame in the other data stream. This calculated CRC data is compared with the CRC data stored in CRC field 722. Matches between these CRC values are used to identify synchronization points between the two data streams.

Figure 7D:
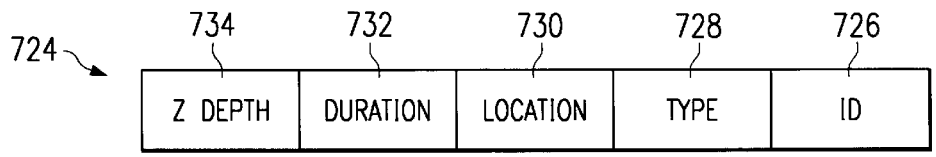

Next, in FIG. 7D, another example of a header used for data packets in a video stream is illustrated. Header 724 includes an ID field 726, a type field 728, a location field 730, a duration field 732, and a z depth field 734. ID field 726 is used to identify the data packet as containing video data. Type field 728 in this example may be used to identify the type of video, such as text, or a frame in a moving video stream. Location field 730 may be used to identify the location on the screen at which the data is to be displayed. Duration field 732 may identify the amount of time the data is to be displayed. Z depth field 734 may be used to identify the depth or order in which the data is to be displayed relative to other video streams. The depth is used to determine the order in which video streams or overlays are displayed on the display.

In the example, header 724 is an example of a header used for a video stream containing text to be displayed as a balloon or pop-up on the screen. In this case, duration field 732 identifies how long the text is to be displayed while the z depth field 734 identifies where the text is to be located with respect to other video streams. Location field 730 provides the xy location on the screen. In the text for display in the pop-up would be found in the payload. In this manner, a video overlay stream dedicated to displaying text, may be used along with moving video data streams.

Figure 8:
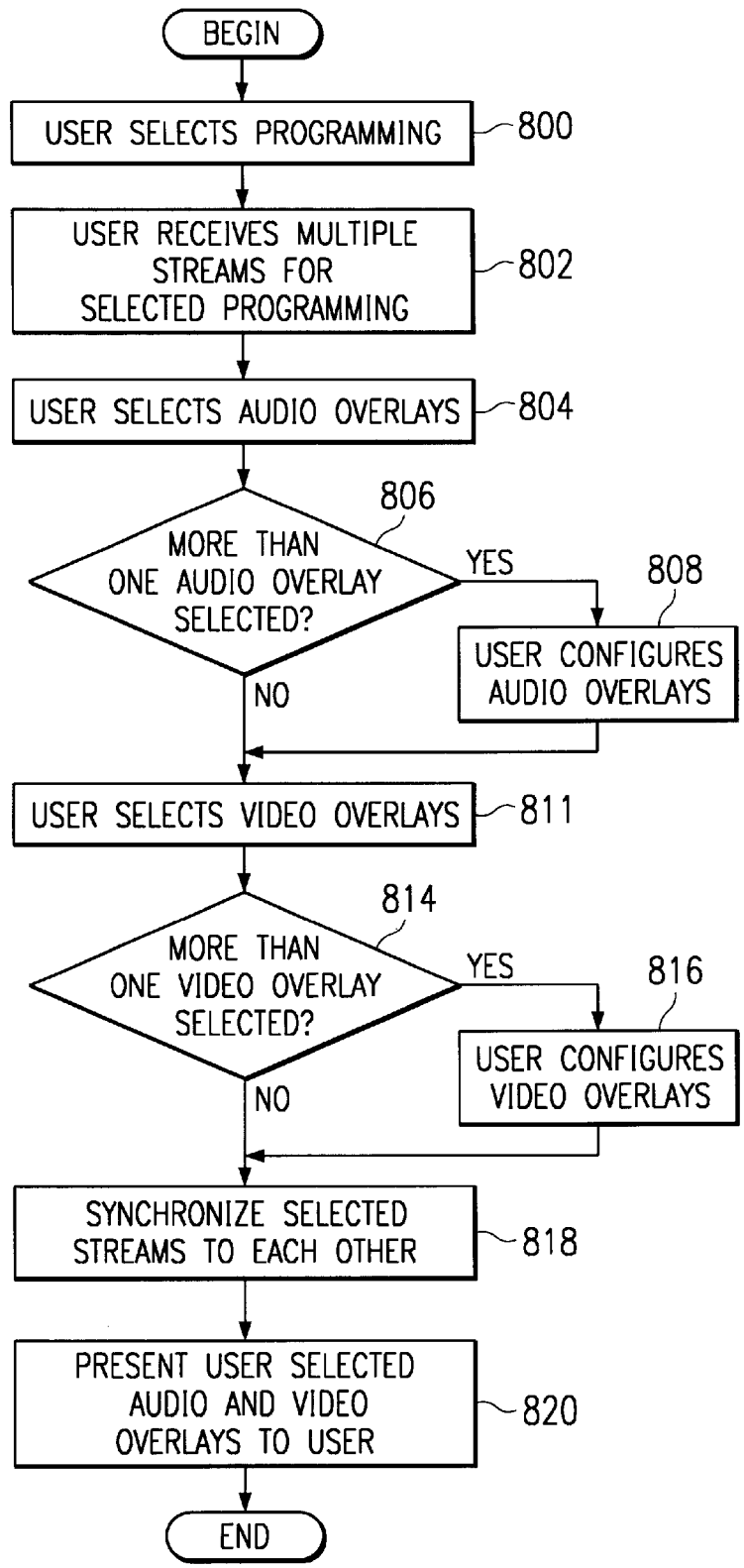
FIG. 8 is a flowchart of a process used to process data streams depicted in accordance with a preferred embodiment of the present invention.

Turning now to FIG. 8, a flowchart of a process used to process data streams is depicted in accordance with a preferred embodiment of the present invention. To start, a user selects programming to be retrieved from a distributed database (step 800). The user receives multiple video and audio streams corresponding to the selected program (step 802). The user selects audio streams (step 804), either directly in real time or through the use of user defined configurations, and, if more than one audio stream is selected (step 806), then the user configures the presentation profile for the selected audio streams (step 808). For example, if three audio streams are chosen, the user could configure the system to play one audio stream on the left channel, one audio stream on a center channel, and one audio stream on a right channel. Alternatively, the user could configure the presentation of the selected audio streams such that the volume of one audio stream is louder than the volume of the other two audio streams.

Next, the user selects, from the plurality of video streams received, one or more video streams to be displayed (step 811). If more than one video stream is selected (step 814), then the user configures the presentation of the multiple video streams (step 816). For example, one video stream could be presented on the left side of the video display and a second video stream could be presented on the right side of the video display. In another example, one video stream might occupy the entire video display screen, while a second video stream was placed in a smaller window within the first video stream. Also, video streams are configurable for such things as opacity and scaling, as well as other factors. Opacity is the semi-transparency as seen in menus overlaid on an event in which the event can be sen through the menu. Scaling may be employed to size display of a video stream on a display device.

Once the media streams are selected and configured by the user, the audio and video streams are synchronized to each other (step 818) and presented to the user in a user configured manner (step 820) with the process terminating thereafter.

With reference again to step 806, if more than one audio stream is not selected, then the process proceeds to step 811 as described above. With reference again to step 814, if more than one video stream is not selected, the process proceeds to step 818 as described above.

Several mechanisms may be employed to synchronize the data streams. For example, a time stamp may be sent with each packet of data in each media stream, then each selected data stream is synchronized to be presented to the user such that data packets with identical time stamps are presented at the same time.

Each data stream also may contain a spike in the data that appears at a periodic rate. The spike in the data may be, for example, a data packet that contains no video or audio. Further, each data stream contains a larger spike that appears at a longer periodic rate. For example, the shorter spike may appear every 30 frames wherein the larger spike appears every 10 seconds. The selected data streams may be synchronized such that they are presented to the user such that the spikes appear in the data streams simultaneously. The longer spike enables the system to resynchronize itself periodically if the data streams have become separated by a period of one or two smaller data spikes.

In a third method of synchronization, cyclic redundancy check (CRC) values. Synchronizing data streams using a CRC data involves calculating CRC data for a first data stream and placing those calculated values in the headers of data packets in the second data stream. The CRC values are placed in data packets in the second data stream that should be synchronized with data packets in the first data stream.

Figure 9:
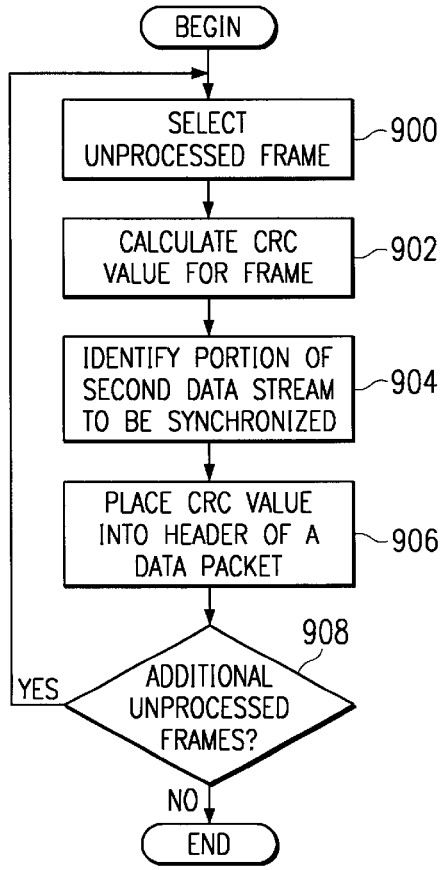
FIG. 9 is a flowchart of a process for generating CRC values for use in synchronizing data streams depicted in accordance with a preferred embodiment of the present invention.

Turning to FIG. 9, a flowchart of a process for generating CRC values for use in synchronizing data streams is depicted in accordance with a preferred embodiment of the present invention. The process illustrated is used for video streams, but may be applied to other types of data streams.

The process begins by selecting an unprocessed frame (step 900). This step selects the first unprocessed frame for content that will be transmitted as a data stream. A CRC value is then calculated for the frame (step 902). The CRC value may be calculated for an entire frame or different portions of the frame. For example, the CRC value may be based on the first five bytes of the frame, five bytes in the middle of the frame, and the last five bytes in the frame.

Next, the portion of a second data stream that is to be synchronized with this frame is identified (step 904). The CRC value is then placed into the header of a data packet for that portion of the data stream (step 906). A determination is then made as to whether additional unprocessed frames are present for processing (step 908). If additional unprocessed frames are present, the process returns to step 900. Otherwise, the process terminates.

The process in FIG. 9 may be used when the data streams are transmitted or broadcast. Alternatively, these processes may be initiated prior to transmitting or broadcasting a data stream. In such a case, the CRC values may be stored and added to the second data stream when that data stream is transmitted.

Figure 10:
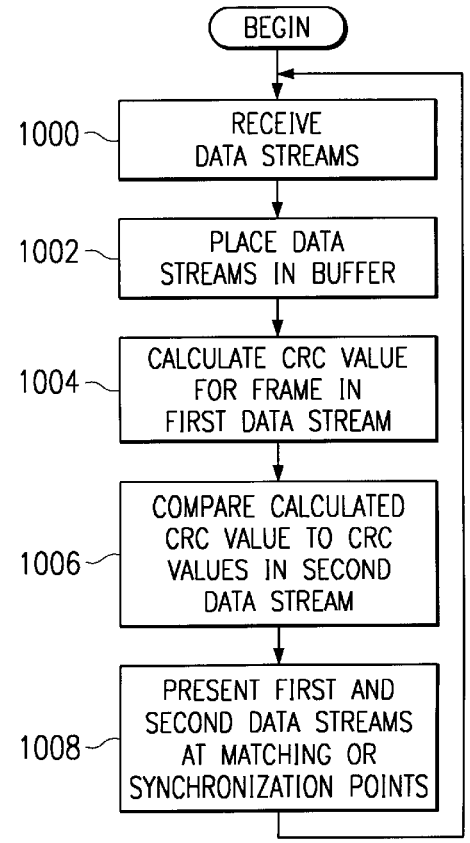
FIG. 10 is a flowchart of a process for synchronizing data streams using CRC data depicted in accordance with a preferred embodiment of the present invention.

Turning now to FIG. 10, a flowchart of a process for synchronizing data streams using CRC data is depicted in accordance with a preferred embodiment of the present invention. The processes illustrated in FIG. 9 may be implemented at the viewer site to synchronize incoming data streams for presentation of a program or event.

The process begins by receiving data streams (step 1000). In step 1000, the data streams are received for presentation. These data streams are placed in a buffer prior to presentation (step 1002). A CRC value is calculated for a frame in the first data stream stored in the buffer (step 1004). Thereafter, the calculated CRC value is compared to CRC values in the second data stream stored in the buffer to identify a point in the second data stream containing a matching CRC value (step 1006). In the depicted examples, CRC values are placed within headers in the second data stream at points where the CRC value should match a calculated CRC value from a portion of the first data stream. Thereafter, the first and second data stream are presented at the matching or synchronization points (step 1008) with the process then returning to step 1000. The present invention could be implemented via one-way or two-way communication depending on the bandwidth of the network type in use.

Thus, the present invention provides a customized experience for a user. The present invention provides this customized experience by providing a number of different types of data streams, audio and video, which are delivered to a client in which the client may select from these data streams to customize the program or event being viewed by the user. Further, the present invention allows for decreasing the amount of bandwidth needed to provide customized programming. This advantage is provided by sending data streams that may be selectively presented for a customized program or event, rather than creating a new data stream for each desired customization of a program or event.

Figure 11:
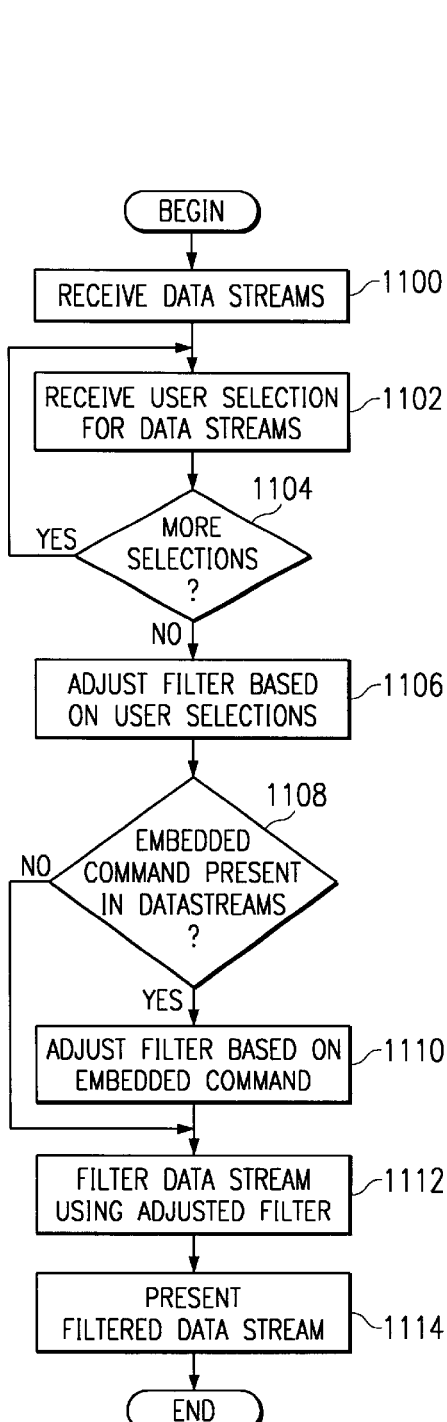
FIG. 11 is a flowchart of a process for filtering data depicted in accordance with a preferred embodiment of the present invention.

With reference now to FIG. 11, a flowchart of a process for filtering data is depicted in accordance with a preferred embodiment of the present invention. This process may be used in a system at the user site to select and customize a program.

The process begins by receiving data streams (step 1100). Thereafter, a user selection is received for the data streams (step 1102). A determination is made as to whether additional user selections are to be made (step 1104). If more user selections are to be made, the process returns to step 1102. Otherwise, a filter is adjusted based on the user selection (step 1106). This filter is used to select data streams received from a content provider for presentation. A determination is then made as to whether an embedded command is present in the data streams (step 1108). This step may check data streams both solicited and unsolicited by the user. Embedded commands may be used by the content provided to ensure that some data streams are presented to the user even though the user may not have selected these data streams for presentation. For example, if an important news event occurs, such as a dangerous storm, the content provider will want to make sure that this information is presented to the user. Also, data streams containing advertising may be presented to the user without the user selecting these data streams.

If an embedded command is present in a data stream, the filter is adjusted based on the embedded command (step 1110). The data stream are then filtered using the adjusted filter (step 1112). The filtered data streams are then presented (step 1114) with the process terminating thereafter. In this manner selected data streams may be presented to the user while unselected data streams are never presented to the user. With reference again to step 1108, if an embedded command is absent from the data stream, the process proceeds directly to step 1112 as described above.

Figure 12:
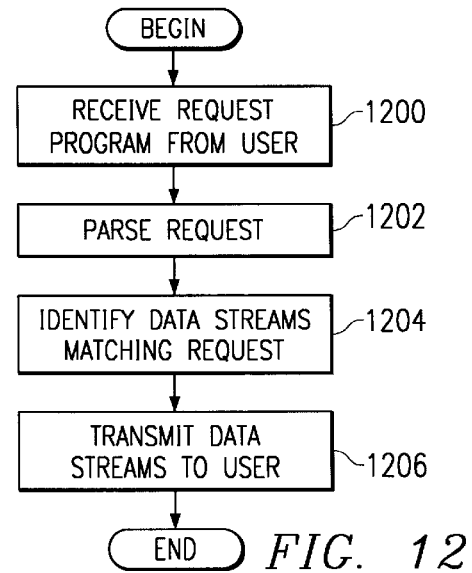
FIG. 12 is a flowchart of a process to customize a program for a user depicted in accordance with a preferred embodiment of the present invention.

Turning now to FIG. 12, a flowchart of a process to customize a program for a user is depicted in accordance with a preferred embodiment of the present invention. This process may be used by a server or source for a content provider to receive customization requests for a program from various users.

The process begins by receiving a request for a program from a user (step 1200). This request may be, for example, the profile from the user system. This profile may include, for example, data streams selected by the user, filters used, location information of the system, and even possibly demographic information for the user. The request is then parsed (step 1202). Data streams matching the requests are identified (step 1204). These data streams include those selected by the user, but also may include data streams selected by the content provider based on the choice of data streams in the request. These additional requests may be presented at the user system through embedded commands in the depicted examples. Thereafter, the data streams identified are transmitted to the user (step 1206) with the process terminating thereafter.

Figure 13:
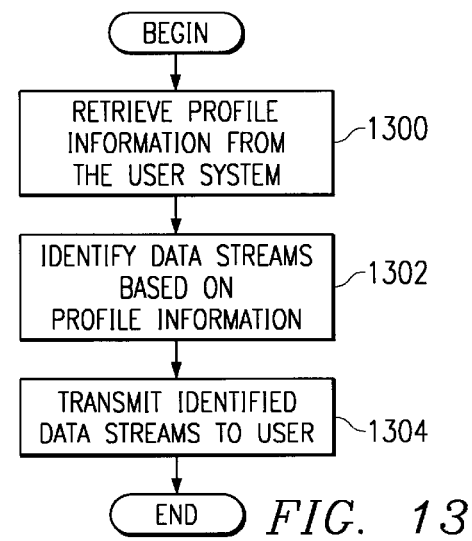
FIG. 13 is a flowchart of a process for retrieving user selection information depicted in accordance with a preferred embodiment of the present invention.

With reference now to FIG. 13, a flowchart of a process for retrieving user selection information is depicted in accordance with a preferred embodiment of the present invention. This process may be used by a content provider to customize programming for a user without requiring the user to send requests to the content provider.

The process begins by retrieving a profile from the user system (step 1300). Thereafter, data streams are identified based on the information from the profile (step 1302). These identified data streams are then transmitted to the user (step 1304) with the process terminating thereafter. This collection of profile information from a user system is performed in real time in the depicted examples. The information may be collected as user selections are made and preferences are set. Alternatively, the information may be received on a periodic basis depending on the implementation. In this manner, up to date profiles are obtained from which data streams may be identified for transmission to the user from which the information was received. The content is tailored based on current selections and preferences by users. This information is better than demographic information because different users may use a particular multimedia system. Of course, demographic information may be used in conjunction with the profile information collected from users.

Figure 14:
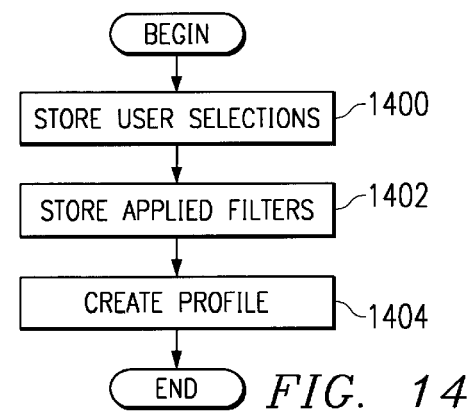
FIG. 14 is a flowchart of a process for creating a profile depicted in accordance with a preferred embodiment of the present invention.

Turning now to FIG. 14, a flowchart of a process for creating a profile is depicted in accordance with a preferred embodiment of the present invention. The process begins by storing user selections of data streams and preferences for presentation (step 1400). Thereafter, filters applied by the user are stored (step 1402). A profile is created with the stored information (step 1404) with the process terminating thereafter. This profile also may include other information about the user, such as, for example, a location of the user system.

By targeting streaming media using the mechanism of the present invention, the amount of bandwidth needed to transmit customized programming is reduced. Furthermore, the present invention allows for targeting of streaming media based on profile information, which increases the effectiveness of the information. Not only can the correct audience for the information be found, but the best mode of presentation of the information can also be found. Based on a profile, information may be presented in different forms that the client can easily understand. For example, a person might be a viewer watching a football game with a statistic filter turned on and a filter giving information about a particular team or player. Targeted advertisement has more of an impact because not only are they targeted for the football viewer (as are conventional advertisement methods), but also for a football fan that responds to numbers (information inferred from the statistics filter in use by the fan), and a football fan that is a fan of a team or player (again inferred from the filter in use).

Also, by collecting profiles from clients, customer feedback can be supplied to vendors supplying the streaming media. That is to say, the consumption of media can be measured in real time allowing dynamic reconfiguration of broadcast material. For example, if more clients are receiving one media stream of a certain type more than others, then, perhaps, more variations of that type of stream should be made available. If more clients exist like factoids, then more time should be spent finding weird facts about the subject of the programming. If more people listen to different audio streams than watch video overlays, then it is justified to invest more money for audio streams.

Turning now to an example of the present invention in which the user profile is not provided directly via input or selection by a user. Consider, instead, a situation in which the user profile is created by the location of a user. For example, perhaps a person is driving in a car equipped with a global positioning system (GPS) such as The NorthStar System in which information on the current location is fed into the client as a filter preference. The parts of the map shown on a heads up display or an advertisement on an audio stream being received, using the present invention, may be based on the location as well as any other preferences. For example, a stream containing an advertisement for a restaurant or other attraction may be sent to the client when the car is within a specified distance from the restaurant or attraction.

Thus, the present invention provides a method and apparatus for allowing user customization of a program as well as reducing bandwidth required to deliver customized programs. By separating the broadcast of the programing to separate streams, media bandwidth in the broadcast medium is saved. For example, a television show has both sound and video in one stream. To broadcast a show in different languages, the same video is sent with different sound coupled to it. With separate streams of video and audio, one stream of video could support all the different audio streams. The "channel" could act like a filter choosing which audio stream to play along with the video. When X different language are supported by supplying an audio stream for each one and only one video stream, (X−1) times the size of the video is the savings in bandwidth.

It should be noted, that although described with reference to use of the streams by one device, the streams can be used by multiple devices as well. Such modification to the present invention will be obvious to those skilled in the art upon reading this description of the invention. Furthermore, streams can be grouped together for the user to select which streams a device or devices will use. Also the streams are not limited to audio or video, but may include other types of information as well such as, for example, graphics and text.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not intended to be exhaustive or limited to the invention in the form disclosed. Many modifications and variations will be apparent to those of ordinary skill in the art. It is important to note that while the present invention has been described primarily in terms of streaming media distributed through a network such as the Internet, the present invention, with appropriate modifications as will be obvious to those of ordinary skill in the art, may also be applied in other contexts such as in broadcast media such as conventional television and in other wireless communication systems employing such communication channels as satellite and microwave transmissions.

Additionally, although the examples are implemented through the transmission of multiple data streams, additional data streams may be embedded within the main or primary data stream or streams. For example, buffering of frames might be employed in which one frame out of every 31 frames contains the additional content. These frames may be buffered until the content is fully assembled and ready or triggered by some user input.

Although the examples have been given in terms of a football game, other events such as movies or concerts would also be typical offerings. Also, although the examples have used location as a parameter, other client characteristics such as machine capabilities can be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a tailored content stream to respective clients from a server comprising the computer implemented steps of:
   receiving requests from a plurality of clients for a given program, said requests including a client profile for each of the respective clients;
   from a plurality of related streams, selecting streams to send to each respective client based on the respective client profile to form selected streams; and
   sending each respective client only respective selected streams for the client;
   wherein the step of generating the client profile comprises the steps of:
      gathering inputs from a user at a client for a selected set of streams;
      sending the inputs to the server; and
      deriving a filter from the set of inputs;
   wherein a client profile for a client developed for a prior event is used to filter streams for a new event until new inputs from the client indicate changes to the client profile are desired.

2. The method as recited in claim 1, wherein the client profile is derived at least in part according to client characteristics.

3. The method as recited in claim 2, wherein the client characteristics comprises location.

4. The method as recited in claim 2, wherein the client characteristics comprises machine capabilities of the client.

5. The method as recited in claim 1, wherein client profiles are developed for specific types of events.

6. The method as recited in claim 5, wherein the specific type of event is a sporting event.

7. The method as recited in claim 5, wherein the specific type of event is a concert.

8. The method as recited in claim 5, wherein the specific type of event is a movie.

9. A computer program product in computer readable media for use in a data processing system for providing a tailored content stream to respective clients from a server, the computer program product comprising:
   first instructions for generating a client profile for each of the respective clients;
   second instructions, from a plurality of related streams, for selecting streams to send to each respective client based on the respective client profile to form selected streams; and
   third instructions for sending each respective client only respective selected streams for the client
   wherein the first instructions comprise:
      fourth instructions for gathering inputs from a user at a client for a selected set of streams;
      fifth instructions for sending the inputs to the server; and
      sixth instructions for deriving a filter from the set of inputs;
   wherein a client profile for a client developed for a prior event is used to filter streams for a new event until new inputs from the client indicate changes to the client profile are desired.

10. The computer program product as recited in claim 9, wherein the client profile is derived at least in part according to client characteristics.

11. The computer program product as recited in claim 10, wherein the client characteristics comprises location.

12. The computer program product as recited in claim 10, wherein the client characteristics comprises machine capabilities of the client.

13. The computer program product as recited in claim 12, wherein client profiles are developed for specific types of events.

14. The computer program product as recited in claim 13, wherein the specific type of event is a sporting event.

15. The computer program product as recited in claim 13, wherein the specific type of event is a concert.

16. The computer program product as recited in claim 13, wherein the specific type of event is a movie.

17. A system for providing a tailored content stream to respective clients from a server, comprising:
   means for generating a client profile for each of the respective clients;
   means, from a plurality of related streams, for selecting streams to send to each respective client based on the respective client profile to form selected streams; and
   means for sending each respective client only respective selected streams for the client;
   wherein the means for generating the client profile comprises:
      means for gathering inputs from a user at a client for a selected set of streams;
      means for sending the inputs to the server; and
      means for deriving a filter from the set of inputs;
   wherein a client profile for a client developed for a prior event is used to filter streams for a new event until new inputs from the client indicate changes to the client profile are desired.

18. The system as recited in claim 17, wherein the client profile is derived at least in part according to client characteristics.

19. The system as recited in claim 18, wherein the client characteristics comprises location.

20. The system as recited in claim 18, wherein the client characteristics comprises machine capabilities of the client.

21. The system as recited in claim 17, wherein client profiles are developed for specific types of events.

22. The system as recited in claim 21, wherein the specific type of event is a sporting event.

23. The system as recited in claim 21, wherein the specific type of event is a concert.

24. The system as recited in claim 21, wherein the specific type of event is a movie.

25. A method in a data processing system for customizing content, the method comprising the dat processing system implemented steps of:
   obtaining a plurality of profiles for a plurality of clients, wherein each profile within the plurality of profiles is an associated profile associated with a client within the plurality of clients and includes preferences for the client;

selecting data streams for each client within the plurality of clients based on an associated profile and client geographic position data to form a set of customized content for the plurality of clients, wherein the client geographic position data is obtained from a positioning system associated with the client; and sending the set of customized content to the plurality of clients, wherein customized content is for an event and wherein the steps of obtaining, selecting, and sending are performed periodically such that presentation of the event is customized during presentation of the event in response to changes in the plurality of profiles.

26. The method of claim 25, wherein the preferences include user selections of data streams.

27. The method of claim 25, wherein the event is a sporting event.

28. The method of claim 25, wherein each profile within the plurality of profiles includes a location of a client.

29. The method of claim 25, wherein each profile within the plurality of profiles includes a configuration of a client.

30. A method for providing a tailored content stream to respective clients from a server comprising the computer implemented steps of:

generating a client profile for each of the respective clients;

from a plurality of related streams, selecting streams to send to each respective client based on the respective client profile and client geographic position data to form selected streams, wherein the client geographic position data is obtained from a positioning system associated with the client; and sending each respective client only respective selected streams for the client, wherein customized content is for an event and wherein the steps of obtaining, selecting, and sending are performed periodically such that presentation of the event is customized during presentation of the event in response to changes in the plurality of profiles.

31. The method as recited in claim 30, wherein the step of generating the client profile comprises the steps of:

gathering inputs from a user at a client for a selected set of streams;

sending the inputs to the server; and deriving a filter from the set of inputs.

32. A computer program product in computer readable media for use in a data processing system for customizing content, the computer program product comprising:

obtaining a plurality of profiles for a plurality of clients, wherein each profile within the plurality of profiles is an associated profile associated with a client within the plurality of clients and includes preferences for the client;

selecting data streams for each client within the plurality of clients based on an associated profile and client geographic position data to form a set of customized content for the plurality of clients, wherein the client geographic position dat is obtained from a positioning system associated with the client; and sending the set of customized content to the plurality of clients, wherein customized content is for an event and wherein the steps of obtaining, selecting, and sending are performed periodically such that presentation of the event is customized during presentation of the event in response to changes in the plurality of profiles.

33. A data processing system for customizing content, comprising:

means for obtaining a plurality of profiles for a plurality of clients, wherein each profile within the plurality of profiles is an associated profile associated with a client within the plurality of clients and includes preferences for the client;

means for selecting data streams for each client within the plurality of clients based on an associated profile and client geographic position data to form a set of customized content for the plurality of clients, wherein the client geographic position data is obtained from a positioning system associated with the client; and means for sending the set of customized content to the plurality of clients, wherein customized content is for an event and wherein the steps of obtaining, selecting, and sending are performed periodically such that presentation of the event is customized during representation of the event in response to changes in the plurality of profiles.

34. A data processing system for customizing content, comprising:

means for obtaining a plurality of profiles for a plurality of clients, wherein each profile within the plurality of profiles is an associated profile associated with a client within the plurality of clients and includes preferences for the client;

means for selecting data streams for each client within the plurality of clients based on an associated profile and client geographic position data to form a set of customized content for the plurality of clients, wherein the client geographic position data is obtained from a positioning system associated with the client; and means for sending the set of customized content to the plurality of clients, wherein customized content is for an event and wherein the steps of obtaining, selecting, and sending are performed periodically such that presentation of the event is customized during presentation of the event in responsed to changes in the plurality of profiles.

* * * * *

UNITED STATES PATENT AND TRADEMARK OFFICE
CERTIFICATE OF CORRECTION

PATENT NO. : 7,010,492 B1
APPLICATION NO. : 09/409593
DATED : March 7, 2006
INVENTOR(S) : Bassett et al.

It is certified that error appears in the above-identified patent and that said Letters Patent is hereby corrected as shown below:

Col. 15, line 28: after "profile" delete "to form selected streams" and insert --and client geographic position data to form selected streams, wherein the client geographic position data is obtained from the positioning system associated with the client--

Signed and Sealed this

Seventeenth Day of April, 2007

JON W. DUDAS
*Director of the United States Patent and Trademark Office*